(12) United States Patent
Koehler et al.

(10) Patent No.: US 7,788,907 B2
(45) Date of Patent: Sep. 7, 2010

(54) EXHAUST INJECTOR SPRAY TARGET

(75) Inventors: Erik Koehler, Birmingham, MI (US);
Dean Tomazic, Orion Township, MI (US); Phillip Adomeit, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 668 days.

(21) Appl. No.: 11/760,116

(22) Filed: Jun. 8, 2007

(65) Prior Publication Data

US 2008/0302088 A1 Dec. 11, 2008

(51) Int. Cl.
*F01N 3/00* (2006.01)
*F01N 3/10* (2006.01)

(52) U.S. Cl. .............................. 60/286; 60/295; 60/299

(58) Field of Classification Search .................. 60/286, 60/295, 299, 303
See application file for complete search history.

(56) References Cited

U.S. PATENT DOCUMENTS

| | | | |
|---|---|---|---|
| 6,041,594 A | 3/2000 | Brenner et al. | |
| 6,382,600 B1 | 5/2002 | Mahr | |
| 6,449,947 B1 | 9/2002 | Liu et al. | |
| 6,516,610 B2 | 2/2003 | Hodgson | |
| 6,601,385 B2 * | 8/2003 | Verdegan et al. | 60/286 |
| 2004/0237511 A1 * | 12/2004 | Ripper et al. | 60/286 |
| 2007/0044456 A1 * | 3/2007 | Upadhyay et al. | 60/295 |

FOREIGN PATENT DOCUMENTS

WO   WO 2005/073527   8/2005

* cited by examiner

*Primary Examiner*—Thomas E Denion
*Assistant Examiner*—Audrey Klasterka
(74) *Attorney, Agent, or Firm*—Julia Voutyras; Alleman Hall McCoy Russell & Tuttle LLP

(57) ABSTRACT

A system for treating exhaust gasses from an engine includes directing a spray of reductant into exhaust gasses against a flow of exhaust gasses to a spray target. A selective catalytic reduction catalyst may be positioned downstream of the reductant injector and downstream of the spray target.

17 Claims, 4 Drawing Sheets

EXHAUST INJECTOR SPRAY TARGET

STATEMENT REGARDING FEDERALLY SPONSORED RESEARCH OR DEVELOPMENT

This invention was developed in the course of work under U.S. government contract DE-FC26-01NT41103. The U.S. government may possess certain rights in the invention.

BACKGROUND AND SUMMARY

Internal combustion engines may utilize an exhaust system that includes a selective catalytic reduction (SCR) catalyst for reducing the amount of NOx that is ultimately discharged to the surrounding environment during operation of the engine. An SCR catalyst may utilize a liquid reductant such as an aqueous urea solution that is injected into the exhaust gasses upstream of the SCR catalyst. Prior to reaching the SCR catalyst, the water droplets within the injected solution may evaporate. The remaining urea component then hydrolyzes and decomposes into ammonia which then enters the SCR catalyst via the exhaust gas flow stream. A catalyst within the SCR catalyst facilitates a reaction between the NOx component of the exhaust gas flow stream and the ammonia to break down the NOx into water vapor and nitrogen gas. The efficiency of this NOx reduction is directly proportional to the degree of vaporization of the aqueous urea solution and uniformity of the distribution of the resulting ammonia within the engine exhaust gasses upstream of the SCR catalyst.

Various systems have been used as an attempt to address incomplete vaporization and distribution of the liquid reductant within the exhaust gas flow stream prior to entering the SCR catalyst in non-stationary or vehicle related applications. The dimensional constraints of such applications have traditionally not allowed for the requisite mixing length between the injector of the liquid reductant and the SCR catalyst to achieve sufficient vaporization and uniform distribution of ammonia across the exhaust gas flow stream profile. For example, where the liquid reductant is not sufficiently vaporized by the exhaust gasses before reaching the catalyst within the SCR catalyst, drops of liquid may be deposited onto the catalyst, which may leave residue upon evaporation and eventually lead to degradation of the catalyst.

In one approach, a system for treating exhaust gasses from an engine, the exhaust gasses routed from the engine to atmosphere through an exhaust passage, is provided. The system comprises an injector directing a spray of liquid reductant into exhaust gasses against a flow of exhaust gasses; a spray target, the spray target having a front and rear surface, where the front surface is convex and generally facing a direction opposite of exhaust flow, the spray target positioned in the passage such that injected reductant impinges on the rear surface of the spray target to increase reductant vaporization; and a selective catalytic reduction catalyst positioned downstream of the injector and downstream of the spray target.

In this way, by injecting a liquid reductant on to a rear surface of a spray target with a convex front surface that generally faces a direction opposite of exhaust flow, backpressure on the engine may be reduced while also enabling sufficient vaporization and uniform distribution of the liquid reductant within the exhaust gas flow stream prior to entering the SCR catalyst.

DETAILED DESCRIPTION

Figure 1:
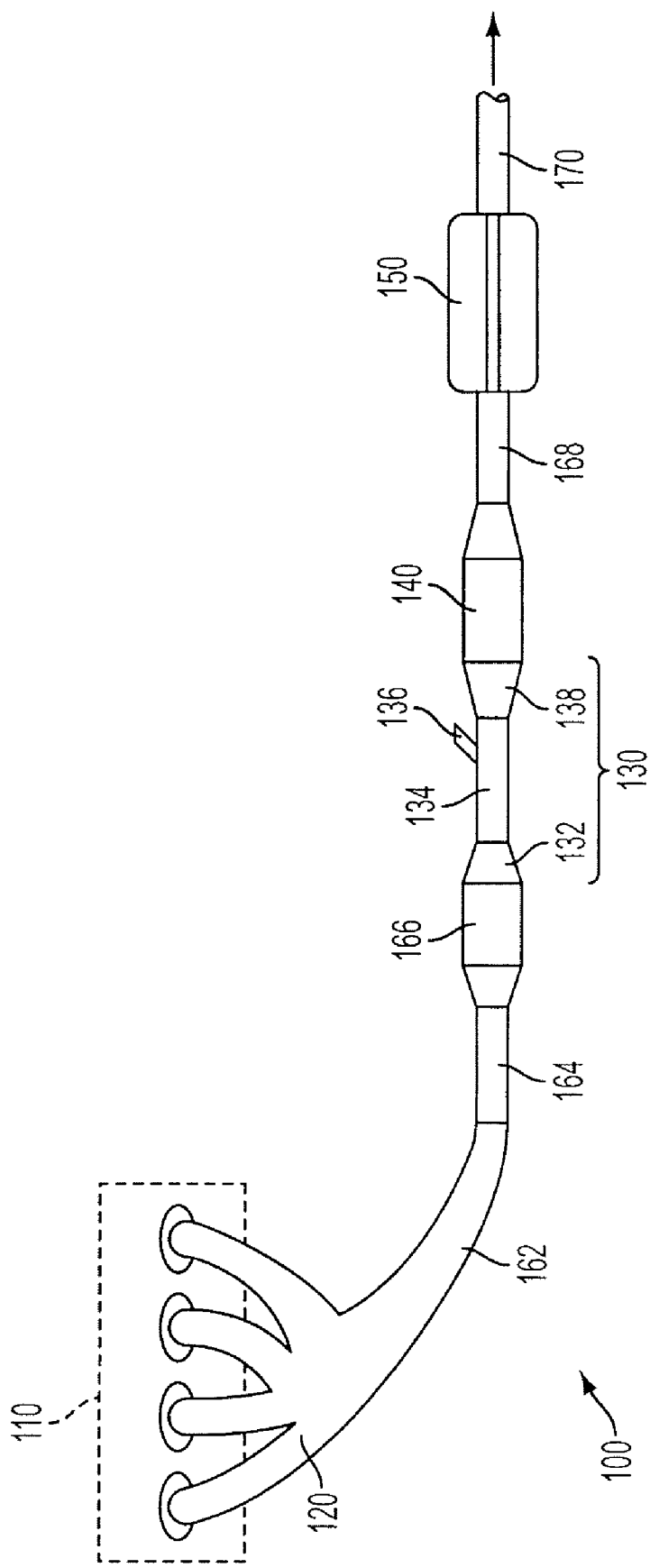
FIG. 1 illustrates an exhaust system for transporting and treating exhaust gasses produced by an internal combustion engine.

FIG. 1 illustrates an exhaust system 100 for transporting and treating exhaust gasses produced by internal combustion engine 110. As one non-limiting example, engine 110 includes a diesel engine that produces a mechanical output by combusting a mixture of air and diesel fuel. Alternatively, engine 110 may include other types of engines such as gasoline burning engines, among others. Further, engine 110 may be configured in a propulsion system for a vehicle. Alternatively, engine 110 may be operated in a stationary application, for example, as an electric generator. While exhaust system 100 may be applicable to stationary applications, it should be appreciated that exhaust system 100 as described herein, is particularly adapted for vehicle applications.

Exhaust system 100 may include one or more of the following: an exhaust manifold 120 for receiving exhaust gasses produced by one or more cylinders of engine 110, an oxidation catalyst 166 arranged downstream of exhaust manifold 120 for reducing unburned hydrocarbons and carbon monoxide in the exhaust gas flow stream, a mixing region 130 arranged downstream of oxidation catalyst 166 for receiving a liquid reductant, a selective catalytic reduction (SCR) catalyst 140 arranged downstream of mixing region 130, and a noise suppression device 150 arranged downstream of SCR catalyst 140. Additionally, exhaust system 110 may include a plurality of exhaust pipes or passages for fluidically coupling the various exhaust system components. For example, as illustrated by FIG. 1, exhaust manifold 120 may be fluidically coupled to mixing region 130 by one or more of exhaust passages 162 and 164. SCR catalyst 140 may be fluidically coupled to noise suppression device 150 by exhaust passage 168. Finally, exhaust gasses may be permitted to flow from noise suppression device 150 to the surrounding ambient environment via exhaust passage 170. Note that while not illustrated by FIG. 1, exhaust system 100 may include a particulate filter arranged upstream of SCR catalyst 140. Furthermore, it should be appreciated that exhaust system 100 may include two or more catalysts.

In some embodiments, mixing region 130 may include a different cross-sectional area or flow area than upstream exhaust passage 164. Mixing region 130 may include a first portion 132, a second portion 134, and a third portion 138. The first portion 132 of mixing region 130 may be configured as a transitional section to accommodate a change in cross-sectional area or flow area between oxidation catalyst 166 and second portion 134 of mixing region 130. First portion 132 may include an exit cone region coupled to an external canister holding oxidation catalyst 166. Second portion 134 of mixing region 130 may include an injector 136 for selectively injecting a liquid into the exhaust system. Second portion 134 may include an exit cone region coupled to an external canister holding the SCR catalyst and/or catalyst. As one non-limiting example, liquid injected by injector 136 may include a liquid reductant such as ammonia or urea. The third portion 138 of mixing region 130 may be configured as an exit cone section to accommodate a change in cross-sectional area or flow area between second portion 134 of mixing region 130 and SCR catalyst 140. Note that SCR catalyst 140 can include various SCR catalysts for reducing NOx or other products of combustion resulting from the combustion of fuel by engine 110.

In some embodiments, injector 136 may be coupled to the wall of second portion 134 of mixing region 130, however, alternative embodiments may include coupling injector 136 to the wall of first portion 132 of mixing region 130. Additionally, alternative embodiments may include arranging injector 136 within the flow area of the first portion 132 of mixing region 130 or the second portion 134 of mixing region 130. Furthermore, a tube or other liquid transporting conduit may be extended from injector 136 to facilitate the direct injection of liquid reductant into a specific location within the exhaust flow stream.

Note that with regards to vehicle applications, exhaust system 100 may be arranged on the underside of the vehicle chassis. Additionally, it should be appreciated that the exhaust passage portions coupling the various exhaust system components may include one or more bends or curves to accommodate a particular vehicle arrangement. Furthermore, the cross-sectional shapes of the various exhaust system components and the exhaust passage portions that couple the various exhaust system components may be circular, oval, rectangular, hexagonal, or any other suitable shape. Further still, it should be appreciated that in some embodiments, exhaust system 100 may include additional components not illustrated in FIG. 1 or may omit components described herein.

Figure 2:
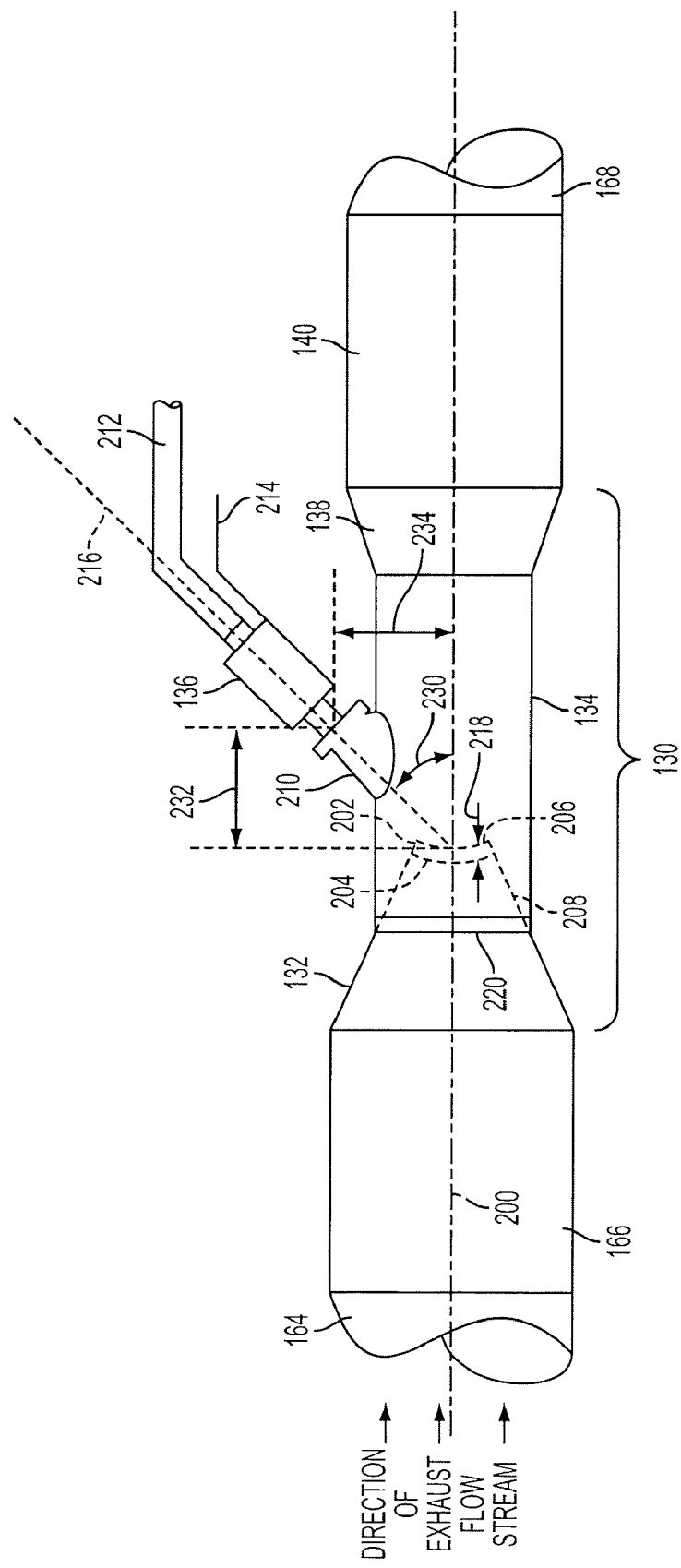
FIG. 2 illustrates a side view of the exhaust system of FIG. 1 in greater detail as a longitudinal cross-section.

FIG. 2 illustrates a side view of mixing region 130 in greater detail as a longitudinal cross-section. A center longitudinal axis of mixing region 130 is indicated at 200. Injector 136 is shown coupled to a wall of the first portion 132 of mixing region 130 by an injector boss 210. Injector 136 can inject, through an opening in the wall of the mixing region, a liquid supplied to it by conduit 212 in response to a control signal received via communication line 214 from an electronic control system of engine 110.

Injector 136 can inject the liquid toward a surface such as spray target 202 along injection axis 216 as a spray. In some embodiments, injection axis 216 can be coincident with a center of the spray pattern provided by injector 136. The spray pattern provided by injector 136 may include a variety of patterns for improving the evaporation rate and dispersion of the liquid reductant within the exhaust gas flow stream. For example, an injector can provide spray patterns that are configured as sheets or hollow cones. However, it should be appreciated that various other suitable spray patterns and/or shapes may be utilized.

Injection axis 216 can be directed at a particular region of an upstream surface such as spray target 202. As one non-limiting example, injection axis 216 can intersect the center of spray target 202, which may also be coincident with longitudinal axis 200. In this example, injector boss 210 is configured to couple injector 136 to the wall of the exhaust system so that injection axis 216 is angled relative to longitudinal axis 200 as indicated by angle 230. As one non-limiting example, angle 230 may be an angle of approximately 45 degrees. As another example, angle 230 may be an angle between 20 degrees and 55 degrees. For example, angle 230 may be a 30 degree angle. However, it should be appreciated that other angles may be utilized.

In some examples, geometric constraints associated with an exhaust system for a vehicle may increase the rate at which mixing and evaporation of the injected liquid reductant within the exhaust gas flow stream are to be performed so that the liquid spray is finely atomized prior to being absorbed by the catalyst. Further, some exhaust system configurations may require that the drops of liquid within the spray be less than a particular size to achieve a particular rate of evaporation and/or mixing of the liquid into the exhaust gasses. As one non-limiting example, the drops of liquid within the spray may be less than 40 microns in diameter, for some exhaust systems. However, the price of an injector may increase in proportion to a decrease in the size of the drops of liquid provided by the spray. Thus, in order to reduce cost of the injector, it may be desirable to improve mixing and evaporation rates so that an injector that produces a spray that is comprised of larger drops of liquid may be used.

Spray target 202 may be configured as a disk having a front surface 204 and a rear surface 206, where front surface 204 is convex and generally facing a direction opposite of the direction of the exhaust flow stream and rear surface 206 is concave and generally facing the direction of the exhaust flow stream, arranged within the exhaust passage upstream of the injector; where the injection axis of the injector intersects the spray target such that injected liquid reductant impinges rear surface 206 of spray target 202.

The shape and size of the cross-sectional area of front surface 204 may be configured to direct the flow of the exhaust stream flow around spray target 202 so as to reduce the back pressure exerted on engine 110. Additionally, the shape and size of the cross-sectional area of rear surface 206 may be configured to increase vaporization and spray dispersion over the cross-section of mixing region 130 before entering SCR catalyst 140. As illustrated in FIG. 2, the cross sectional area of spray target 202 may be generally circular in shape. In other embodiments, the shape of the cross-sectional area of spray target 202 may be elliptical, hexagonal, rectangular, or another suitable shape. Although shown in FIG. 2 as a solid disk, spray target 202 may be configured as a perforated or non-contiguous entity such that a portion of injected reductant is allowed to pass through the spray target upon impingement of the overall spray pattern. In other embodiments, spray target 202 may be configured with fins or additional surfaces to alter the vaporization and dispersion of the liquid reductant, and/or heat transfer/temperature characteristics.

The curvature of front surface 204 of spray target 202 may also be varied to direct the flow of the exhaust gas stream flow around spray target 202 so as to reduce back pressure that is exerted on engine 110. Additionally, the curvature of rear surface 206 may also be varied so as to increase vaporization and spray dispersion over the cross-section of mixing region 130 before entering SCR catalyst 140. Spray target 202 may include a longitudinal width or thickness 218 that may be varied to modify the heat transfer characteristics of spray target 202 such that spray target 202 will maintain an overall average temperature within a range that will sustain a designated vaporization rate of the liquid reductant. For example, the target may be thicker in a central region, and thinner at outer regions.

As FIG. 2 illustrates injection axis 216 may be inclined at an angle of approximately 45 degrees, where the longitudinal distance between the point of injection and spray target 202, as indicated by 232, can be equal to the distance between the point of injection and longitudinal axis 200, as indicated at 234. However, where injection axis 216 is inclined at a different angle relative to longitudinal axis 200, spray target 202 may be arranged at a different distance from the point of injection in order that injection axis 216 is directed at a particular region of the spray target, for example, the center of the spray target. Thus, if angle 230 is instead inclined at 30 degrees, longitudinal distance 232 may be increased relative to distance 234 so that injector axis 216 remains directed at the center of spray target 202. In this manner, dimensions 232, 234, and 230 may be selected so that injection axis 216 is directed at a particular region of spray target 202. Additionally, spray target 202 may be arranged at various points on a plane orthogonal to longitudinal axis 200 so as to increase vaporization and dispersion of the liquid reductant.

Figure 3:
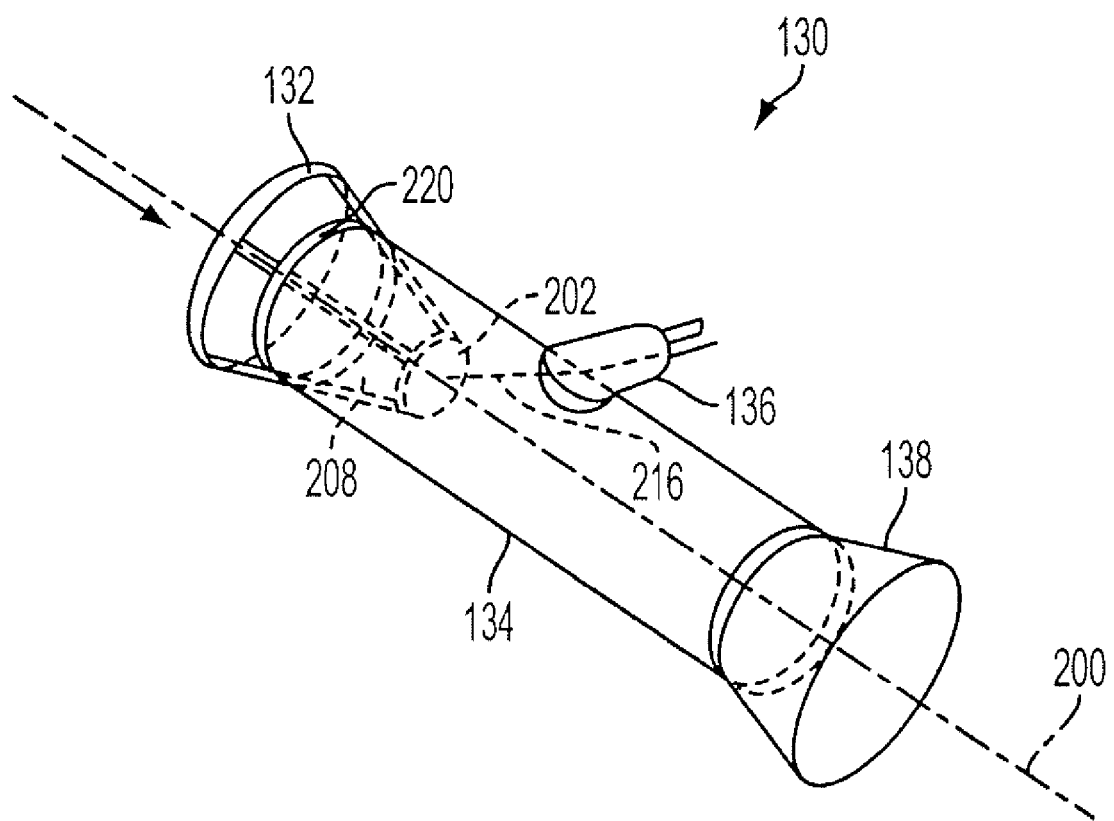
FIG. 3 illustrates a perspective view of the mixing area of FIG. 1 in greater detail as a longitudinal cross-section.

FIG. 3 provides an additional view of mixing region 130 as described herein including injector 136 having an injection axis 216 inclined relative to the longitudinal axis 200 of the first portion 132 and the second portion 134 of mixing region 130, and a spray target 202 arranged upstream of injector 136 for improving evaporation and dispersion of the injected liquid reductant within the exhaust gas flow stream prior to entering SCR catalyst 140. As depicted by FIG. 3, the center of spray target 202 may be arranged along longitudinal axis 200. In some embodiments, the center of spray target 202 may be arranged at various different locations along longitudinal axis 200 within first portion 132 of mixing area 130 or second portion 134 of mixing area 130. Furthermore, some embodiments may dispose of the center of spray target 202 at various locations within first portion 132 and second portion 134 of mixing area 130 not coincident to longitudinal axis 200.

As depicted by FIG. 3, spray target 202 may be held in place by multiple support members 208 that are also attached to mounting flange 220. Alternative embodiments may include spray target 202 being held in place by a single support member 208. Additionally, support member 208 may be of a rigid or semi-rigid construction. As shown, mounting flange 220 may be configured as a concentric ring of variable thickness that is arranged between first portion 132 and second portion 134 of mixing region 130 and allows for the exhaust flow stream to traverse the through-hole formed by mounting flange 220. Although depicted as having a circular cross-sectional shape, alternative embodiments may include mounting flange 220 having a rectangular, elliptical, hexagonal, or other suitable cross-sectional shape. Furthermore, mounting flange 220 may be arranged between oxidation catalyst 166 and first portion 132 of mixing region 130 as depicted by FIG. 3, or may be eschewed entirely for other spray target mounting configurations. For example, spray target 202 may be held in place by at least one support member 208 that is coupled to the wall of first portion 132 or second portion 134 of mixing area 130.

It should be appreciated that although FIG. 3 illustrates spray target 202 arranged in second portion 134 of mixing area 130, alternative embodiments may dispose of spray target 202 upstream of second portion 134. For example, first portion 132 of mixing region 130 may be configured as an exit cone directing the exhaust gas flow stream from oxidation catalyst 166 into second portion 134 and mounting flange 220 may be arranged between oxidation catalyst 166 and first portion 132 thereby disposing spray target 202 within the central region of the exit cone formed by first portion 132.

Furthermore, disposing of spray target 202 within the central region of the exit cone formed by first portion 132 of mixing region 130 may include arranging injector 136 within the flow area of first portion 132 or coupling injector 136 to the wall of first portion 132. Additionally, a tube or other liquid transporting conduit may be extended from injector 136 to facilitate the direct injection of liquid reductant into a specific location within the exit cone formed by first portion 132. By positioning the target in an exit code with an expanding cross sectional area, it is possible to reduce backpressure while obtaining sufficient vaporization and mixing to achieve improved results.

A non-limiting example of a specific implementation of the exhaust system illustrated in FIG. 3 will be described. As one example, the diameter of the exhaust passage in which spray target 202 is arranged may be 4 inches and the diameter of spray target 202 may be 62 mm. Additionally, the distance between the discharging orifice of injector 136 and spray target 202 may be 150 mm. This example implementation, when utilized with an injection of an aqueous urea solution, can be used to achieve a vaporization rate in excess of 50% upon impingement of reductant on spray target 202. Furthermore, this example implementation can be used to achieve NOx conversion rates in excess of 95% upon processing of exhaust gases by SCR catalyst 140. Thus, the conversion of NOx by the SCR catalyst may be improved while reducing the deposition of residues from the injected liquid.

It should be appreciated that the above specific implementation is just one example of the relative dimensions that may be used, and that the present disclosure enables different relative dimensions to be used. Furthermore, it should be appreciated that one or more of the various exhaust system components may include cross-sections that have shapes that are non-circular. For example, cross-sections of the exhaust components may be ovals, rectangles, squares, or other suitable shapes.

Figure 4:
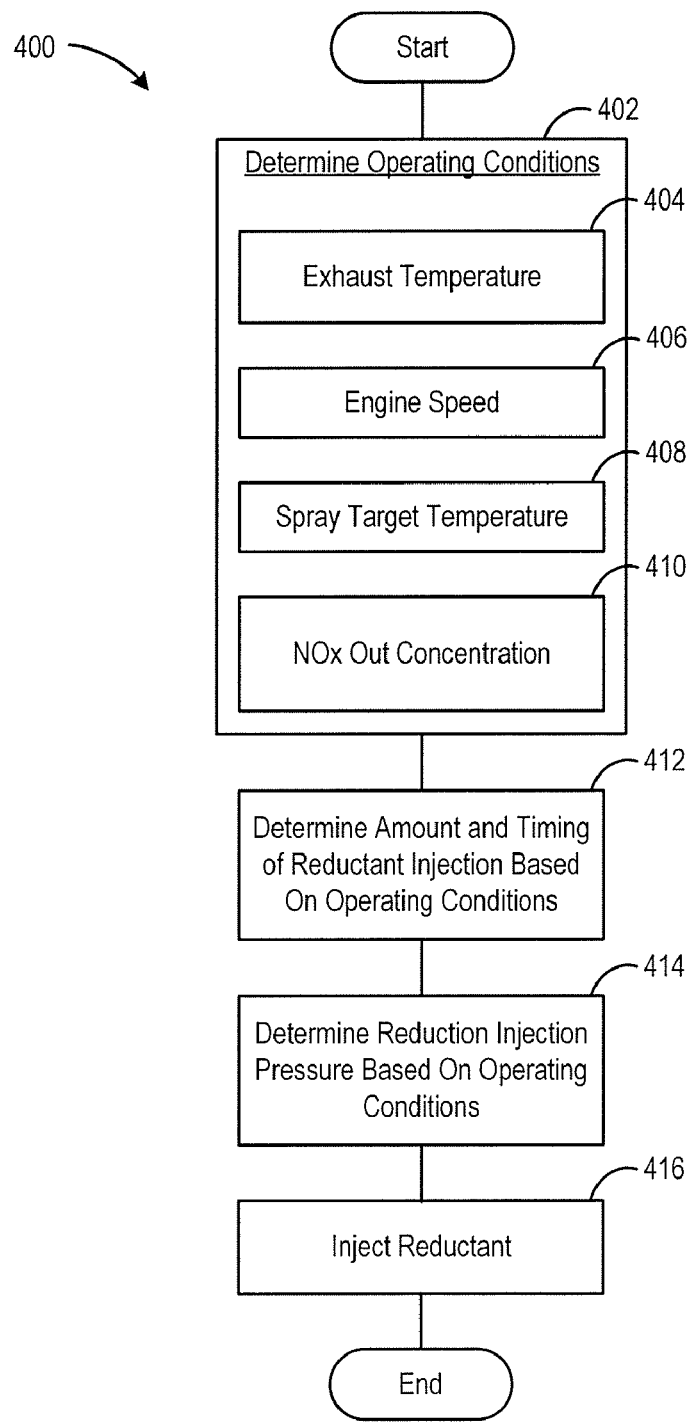
FIG. 4 illustrates a routine for adjusting the injection of liquid reductant into a mixing area.

FIG. 4 exemplifies a routine for adjusting the injection of liquid reductant into a mixing area. At 402, a control unit of the vehicle senses vehicle operating conditions, e.g., exhaust temperature, engine speed, spray target temperature, NOx out concentration. At 412, the control unit determines the amount of liquid reductant to be injected into mixing area 130 and the timing of the injection based on the vehicle operating conditions. At 414, the control unit determines the pressure at which the liquid reductant will be injected into mixing area 130 based on the vehicle operating conditions. At 416, the control unit signals injector 136 to inject liquid reductant into mixing area 130 such that the liquid reductant impinges rear surface 206 of spray target 202.

In this way, it is possible to adjust reductant injection with operating conditions to take advantage of various system operating characteristics when using a spray target configuration such as described herein.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for treating exhaust gasses from an engine, the exhaust gasses routed from the engine to atmosphere through an exhaust passage, the system comprising:
   an injector directing a spray of reductant into exhaust gasses against a flow of exhaust gasses;

a spray target, the spray target having a front and rear surface, where the front surface is convex and generally facing a direction opposite of exhaust flow, the target positioned in the passage such that injected reductant impinges on the rear surface of the spray target to increase reductant vaporization;

a selective catalytic reduction catalyst positioned downstream of the injector and downstream of the spray target; and an oxidation catalyst positioned upstream of the injector and upstream of the spray target, the oxidation catalyst having an exit cone, the target being positioned in the exit cone.

2. The system of claim 1 wherein injected reductant impinges directly on the rear surface of the spray target.

3. The system of claim 1 wherein the injector is configured to inject a variable amount of reductant as operating conditions of the engine vary.

4. The system of claim 1 where the spray target is shaped to receive heat from the exhaust gasses and operate at a temperature above a vaporization temperature of the reductant.

5. The system of claim 1 where the spray target is positioned in a central region of the exhaust passage such that exhaust gas flows in a generally ring-shaped region between the spray target and the exhaust passage.

6. The system of claim 1 wherein the injector injects reductant at an angle relative to an axis of the passage in a region in which the injector is coupled to the passage.

7. The system of claim 1 wherein the spray target is disk-shaped and has a solid front convex surface, and where an injection axis of the injector intersects the spray target such that injected reductant impinges the rear surface of the spray target.

8. The system of claim 7 wherein the rear surface of the spray target is concave.

9. An engine control method comprising:
injecting reductant into engine exhaust gasses in a direction against a flow of exhaust gas from the engine;
impinging injected reductant onto a concave, solid, surface in the flow of exhaust gas;
vaporizing at least some of the injected reductant on the surface, where exhaust gas carries the vaporized reductant to a selective catalytic reduction catalyst; and
varying a reductant injection amount based on a temperature of the surface.

10. The method of claim 9 where the injected reductant is injected at an angle relative to an axis of an engine exhaust passage in a region of reductant injection, and where the injected reductant impinges onto the surface downstream of an oxidation catalyst.

11. The method of claim 9 further comprising varying a reductant injection pressure based on the temperature of the surface.

12. A system for treating exhaust gasses from an engine, the exhaust gasses routed from the engine to atmosphere through an exhaust passage, the system comprising:
an injector coupled to the exhaust passage, the injector directing a spray of liquid reductant into exhaust gasses generally in an opposite direction of exhaust flow;
a solid plate spray target, where the spray target has a convex front surface generally facing a direction of exhaust flow, the spray target positioned in a central region of the exhaust flow such that exhaust gas flows around the spray target, where the spray target is shaped to receive heat from the exhaust gas and operate at a temperature above a vaporization temperature of the reductant such that injected reductant impinges directly on a rear surface of the spray target to increase reductant vaporization;
an oxidation catalyst positioned upstream of the injector and upstream of the spray target, the oxidation catalyst having an exit cone, the target being positioned in the exit cone; and
a selective catalytic reduction catalyst positioned downstream of the injector and downstream of the spray target.

13. The system of claim 12 where the injector is coupled at an angle relative to the exhaust passage.

14. The system of claim 13 where the injector is positioned such that a central axis of the injector is aimed directly onto the front surface of the spray target.

15. The system of claim 14 where the central axis of the injector is aimed at a center of the spray target.

16. The system of claim 14 where the rear surface is concave.

17. The system of claim 16 where relative size of spray target diameter to exhaust passage diameter is less than 0.91.

* * * * *